United States Patent [19]
Brown

[11] 3,790,229
[45] Feb. 5, 1974

[54] EMERGENCY APPLICATION BRAKE VALVE ASSEMBLY AND SYSTEM

[75] Inventor: Curtis L. Brown, West Dundee, Ill.

[73] Assignee: The Berg Manufacturing Company, Des Plaines, Ill.

[22] Filed: Aug. 14, 1972

[21] Appl. No.: 280,512

[52] U.S. Cl............... 303/52, 137/627.5, 188/170, 303/9
[51] Int. Cl............................................. B60t 15/06
[58] Field of Search..... 303/52, 40, 9, 2, 53, 54, 56, 303/13, 48; 188/170; 137/627.5

[56] References Cited
UNITED STATES PATENTS

| | | | |
|---|---|---|---|
| 3,266,851 | 8/1966 | Bueler | 303/54 |
| 3,479,096 | 11/1969 | Cruse | 303/13 |
| 3,464,742 | 9/1969 | Cruse | 303/52 |
| 3,572,846 | 3/1971 | Cruse | 303/52 |

Primary Examiner—Duane A. Reger
Assistant Examiner—D. C. Butler
Attorney, Agent, or Firm—Howard T. Markey et al.

[57] ABSTRACT

A brake application valve assembly and system having emergency brake application and control elements operable with each operation of the application valve. The brake valve assembly includes a treadle, a service valve structure, an emergency valve structure between the treadle and the service valve structure, and a shaft movable in response to movement of the treadle and extending into the emergency valve structure. In addition, the brake assembly includes a piston positioned in the emergency valve structure for movement in response to movement of the shaft and against elements in the application valve structure to operate the application valve structure.

6 Claims, 2 Drawing Figures

EMERGENCY APPLICATION BRAKE VALVE ASSEMBLY AND SYSTEM

OBJECTS OF THE INVENTION

This invention relates to vehicle brake systems and particularly to fluid pressure brake systems utilized in tractor trailer vehicles and the like.

One purpose of the invention is to provide an application valve having emergency-responsive elements operated within the range of normal foot pedal movement.

Another purpose is to provide a modulated application valve having modulated emergency condition responsive elements operable thereby.

Another purpose is to provide an emergency-application valve assembly including means balancing the operation of emergency responsive elements.

Another purpose is to provide an emergency-application valve assembly including yielding means modulating emergency-responsive elements thereof.

Another purpose is to provide a vehicle brake application assembly including means effective to overcome the effects of human error on the part of the vehicle operator.

Another purpose is to provide an emergency-application valve assembly including fluid pressure balancing means for emergency-responsive elements thereof.

Other purposes may appear from time to time during the course of the specification and claims.

BRIEF DESCRIPTION OF THE DISCLOSURE

The invention is illustrated more or less diagrammatically in the accompanying drawings wherein:

FIG. 1 is a side view in cross-section and illustrating one form of the invention; and FIG. 2 is a side view in cross-section illustrating another form of the invention.

Like parts are indicated by like numerals throughout the specification and drawings.

DESCRIPTION OF THE PREFERRED EMBODIMENT

Figure 1:
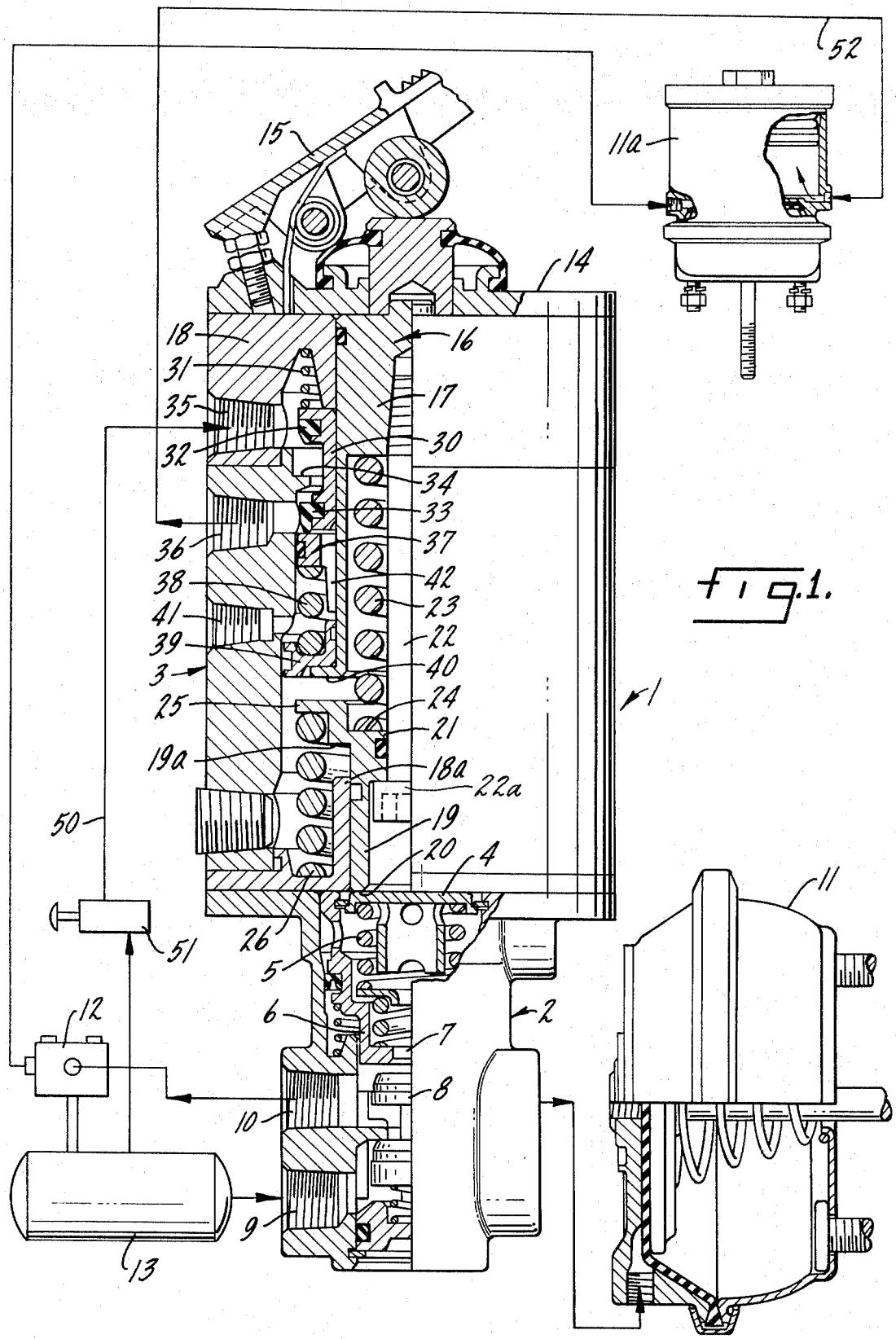

Referring now to the drawings, and particularly to FIG. 1, the numeral 1 generally designates a brake application valve assembly, including a service brake application portion 2 and an emergency brake application portion 3. Since the service application valve portion 2 and its operation will be fully understood by those skilled in the art and particularly by reference to U.S. letters Pat. No. 3,449,020 issued June 10, 1969 and entitled "Dual Force Treadle Application Valve," it will be sufficient to indicate that the plate 4 when moved downwardly against the action of spring 5, produces downward movement of piston 6 to close exhaust passage 7. Further downward movement of piston 6 opens valve member 8 to permit flow of fluid pressure from inlet 9 to outlet 10 and thus to the front wheel brake chambers 11 of a tractor vehicle, for example, to apply the front wheel brakes. Operation of valve portion 2 also delivers fluid pressure to a relay valve 12 for delivery of fluid pressure therethrough from source 13 to rear wheel brake actuator 11a of a tractor and to the brake actuator of a trailer from and through a similar source and relay valve carried on the trailer. The valve 12 may, for example, take the form of that disclosed in U.S. letters Pat. No. 3,181,917, issued May 4, 1965 and entitled "Relay Valve."

Between the application valve structure 2 and a floor plate 14, on which a treadle or brake pedal 15 is pivoted for operation by the vehicle driver, the invention contemplates the positioning of the emergency responsive valve structure 3. Operating shaft 16 extends upwardly through the plate 14 to provide for contact by the brake treadle 15. Operating shaft 16 includes an enlarged cylindrical portion 17 slidable within housing 18. A hollow piston 19 is slidable in a sleeve 18a positioned in the lower portion of housing 18 and includes an end surface 20 in contact with plate 4. As indicated at 21, a shaft extension 22 is secured to enlargement 17 and is slidable in piston 19. Extension 22 carries head 22a for contact with an internal undersurface on piston 19 as shown.

A first spring 23 has its opposite ends in engagement with shaft enlargement 17 and with an upper surface 24 of piston 19. An annular flange 25 at the upper edge of piston 19 is in turn engaged at its undersurface by a second spring 26, the opposite end of which engages an annular portion of the sleeve 18a forming a floor portion of housing 18.

A valve shuttle 30 is slidable on shaft enlargement 17 and is urged downwardly by relatively light spring 31. The shuttle 30 is dual-headed, carrying an upper, as the parts are shown, seal or valve face 32 and a lower seal or valve face 33. A seat 34 is provided within housing 18 for engagement by valve face 32. It will be observed that the seat 34 is positioned intermediate the ports 35, 36 formed in housing 18. Beneath port 36 is a movable, annular seat 37 provided for valve face 33. A fourth spring 38 has its opposite ends in engagement with the undersurface of seat 37 and the upper surface of a ring 39. It will be observed that ring 39 is supported on an annular, outwardly directed, lower flange 40 of shaft enlargement 17. An exhaust outlet port 41 communicates the area between seat 37 and ring 39 with atmosphere, the space 42 providing for communication between ports 41 and 36 when valve face 33 is off seat 37.

A conduit 50 communicates source 13 with inlet port 35 and is controlled by a valve 51 in the conduit 50. The valve 51 may take the form of a conventional dash control valve operable by the vehicle driver and having a first position communicating source 13 with inlet 35 and a second position closing communication with source 13 and exhausting port 35 to atmosphere. A conduit 52 communicates port 36 with the fluid pressure chamber portion of actuator 11a to compress and hold inactive the brake actuating spring therein. It will be understood that the actuator 11a includes a service brake actuating portion and an emergency brake actuating portion, a more detailed understanding thereof being available from U.S. letters Pat. No. 3,302,530, issued Feb. 7, 1967 and entitled "Pressurized Brake Cylinder Using Inlet Pressure as a Boost."

Figure 2:
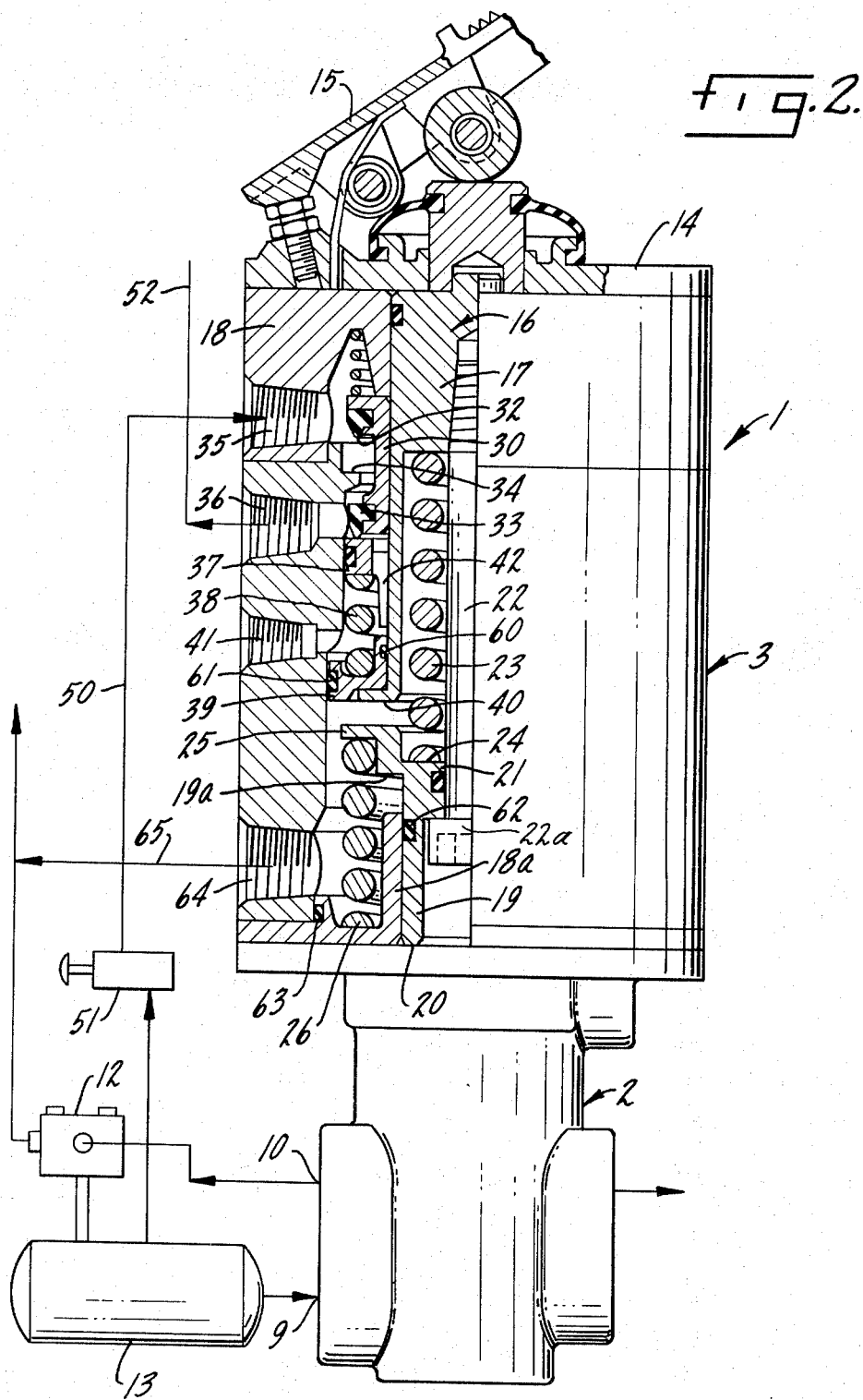

Referring now to FIG. 2, it will be observed that seals, which may take the form of the 0-rings 60, 61, have been positioned between the ring 39 and enlargement 17 and between ring 39 and the inner wall surface of housing 18 beneath the exhaust port 41. Seals 62, 63 have been positioned between piston 19 and the upwardly extending sleeve element 18a in the bottom portion of housing 18 and between an annular segment of said element and the housing 18. In the form of FIG. 2, also, the port 64 has been opened in the housing 18 beneath ring 39. A conduit 65 communicates the source 13 and valve 12 with port 64 to supply service fluid pressure thereto. The remainder of the structure illustrated in FIG. 2 corresponds to that shown in FIG. 1 and described above.

The use, operation and function of the invention are as follows:

Each time the vehicle operator depresses pedal 15 during normal vehicle operation, enlargement 17 and extension 22 are moved downwardly as the parts are shown. Spring 23 is of relatively great strength, substantially greater than springs 26 and 38. Hence, in normal operation, the movement of pedal 15 will be transmitted through spring 23, with little or no compression thereof, to piston 19 and therethrough to plate 4 in the service application brake valve portion 2 to produce the normal braking action upon the vehicle, the service brake valve portion 2 being effective to deliver service fluid pressure to the service chambers and actuators 11, 11a.

Downward movement of enlargement 17 permits a corresponding downward movement of ring 39. Spring 38, however, being substantially stronger than spring 31 insures maintenance of the contact of seal 33 with seat 37 and continuation of the parts 30, 33, 37 in the relative positions illustrated in FIG. 1.

It will be noted that port 35 is in communication with port 36 at all times when valve face 32 is off its seat 34. Hence, fluid pressure delivered from source 13 to port 35 is transmitted through port 36 and conduit 52 to the emergency chamber of the brake actuator 11a and the emergency brake applying spring therein is held in inactive, compressed state. It will be observed also that the space between flanges 25 and 40 is two-thirds of that between space 32 and seat 34 and the space between space 32 and seat 34 is equal to that between the upper edge of sleeve 18a and the opposed, abuttable surface 19a of piston 19. Since ports 35,36 are normally in communication, the emergency brake actuator may be operated by the vehicle drive in the normal manner, i.e., by operation of dash control valve 51, the operator moving valve 51 to its exhaust position to diminish or dissipate the air from the emergency chamber through conduit 52, ports 36,35, conduit 50 and valve 51.

Should the vehicle operator's movement of pedal 15 fail to produce normal braking action through the service system in response to actuation of service brake valve assembly 2, the operator's continued movement of pedal 15 serves to compress spring 23 and to move the flange 40 further downwardly as the parts are shown. The spring 38 being thus opened and the valve face 32 being thus seated on seat 34 the seat member 37 separates from valve face 33 to communicate the air chamber in emergency actuator 11a through conduit 52, port 36, and space 42 with atmosphere through exhaust 41. Thus, the air is dissipated from the emergency actuator 11a and the emergency spring therein is freed to apply the brakes to the vehicle. The seating of valve face 32 on seat 34 closes source 13 against the escape of air therefrom. Thus, the emergency brake actuator of the vehicle is operated under such conditions without the necessity for separate operation of the valve 51 or intervention by the vehicle operator.

Thus, the emergency elements of assembly 3 are present and are partially moved during the normal operation of the assembly of the invention, the operation of application valve 2, under normal conditions, being unaffected thereby. Similarly, a standard application valve may be employed without modification. Should the service system fail due to a ruptured diaphragm, a broken service line or the like, the same emergency elements of assembly 3 are automatically operated to produce immediate application of the brakes of the vehicle through the mediacy of the spring in actuator 11a in response to depression of the same brake pedal 15 employed in normal operation.

In the form of the invention illustrated in FIG. 2, balancing service fluid pressure is delivered beneath ring 39 to which seals 60,61 have been added. The seals 62,63 insure against escape of fluid pressure delivered at port 64. The fluid pressure thus delivered retains ring 39 in the position shown, for example, in the drawings and thus retains seat 37 in contact with valve face 33 and precludes emergency brake application by closing communication between the actuator 11a and exhaust outlet 41. Thus even an inadvertent maximum depression of pedal 15 is precluded from producing emergency brake application, as above described, so long as normal service fluid pressure is available in the system. In the absence of adequate service fluid pressure, due to a ruptured diaphragm, a broken service line or the like, the operation of the device of FIG. 2 corresponds to that described above in relation to the structure of FIG. 1, i.e., depression of pedal 15 beyond a predetermined point enables separation of seat 37 from valve face 33 and the consequent exhaust of the emergency chamber of actuator 11a and the consequent application of brakes by the spring in actuator 11a.

I claim:

1. A brake valve assembly including a treadle, a service application valve structure, an emergency valve structure between said treadle and said service valve structure, a shaft movable in response to movement of said treadle and extending into said emergency valve structure, a piston positioned in said emergency valve structure for movement in response to movement of said shaft and against elements in said service application valve structure to operate said service application valve structure, said emergency valve structure includes a first port, a second port normally in communication with said first port, first means slidable on said shaft to close communication between said ports, an exhaust outlet, second means slidable on said shaft to open communication between said second port and said exhaust outlet, spring means positioned to urge said first means against closing said communication between said ports and said second means against opening communication between said second port and said exhaust outlet, said spring means being rendered ineffective in response to movement of said shaft beyond a predetermined distance.

2. The structure of claim 1 characterized by and including a source of fluid pressure, a spring applied-fluid pressure released emergency brake actuator, said source communicating with said actuator through said first and second ports.

3. The structure of claim 1 characterized by and including means communicating said source with said emergency valve structure for delivery of fluid pressure in position therein to preclude opening of said emergency valve structure.

4. The structure of claim 3 further characterized in that said delivery communicating means includes a third port to deliver fluid pressure to said spring means.

5. A brake valve assembly including a treadle, a service application valve structure, an emergency valve structure between said treadle and said service valve structure, a shaft movable in response to movement of said treadle and extending into said emergency valve structure, a piston positioned in said emergency valve structure for movement in response to movement of said shaft and against elements in said service application valve structure to operate said service application valve structure, a source of fluid pressure, a first conduit communicating said source with said service application valve structure, a spring applied-fluid pressure released emergency brake actuator, a second conduit communicating said source with said actuator through said emergency valve structure, said emergency valve structure including valve means effective to close communication of said source with said actuator and open communication between said actuator and atmosphere in response to movement of said shaft toward said service application valve structure beyond a predetermined distance.

6. The structure of claim 5 characterized by and including a third conduit communicating said source with said emergency valve structure to render said valve means inoperative.

* * * * *